Patented Feb. 22, 1938

2,109,122

UNITED STATES PATENT OFFICE 2,109,122

MAKING FERROCHROMIUM

Marvin J. Udy, Niagara Falls, N. Y.

No Drawing. Application May 3, 1935,
Serial No. 19,749

14 Claims. (Cl. 75—11)

This invention relates to making ferrochromium, and it comprises a method of producing directly ferrochromium of a controlled carbon content from chromite ores having a high ratio of chromium to iron, wherein such a chromite ore is smelted in an electric furnace with sufficient carbon for reduction and in the presence of enough added lime to make a highly basic slag, the temperature of the furnace being carried high enough to make this basic slag thinly liquid and produce a clear separation of the reduced metal; all as more fully hereinafter set forth and as claimed.

The manufacture of ferrochromium is largely an empirical process. Because of the difficult reducibility of chromium, the complexity of its chemistry and the high melting point of ferrochromium, smelting is a high temperature electric furnace operation which practically amounts to heating a mixture of coke and ore to the point where molten ferrochromium appears; operation being controlled by various empirical considerations to make the furnace operation as nearly continuous as possible. The standard practice in reducing natural chromite ores containing chromium and iron in a sufficiently high ratio to make ferrochromium containing over 60 per cent chromium with 4 to 6 per cent carbon has not been changed or improved over a long period of years.

The object achieved in the present invention is the production of this standard grade of ferrochromium from standard chromite ores by a simpler and more economical mode of operation, but the improvements apply to other grades carrying, respectively, 1.5 to 2 per cent carbon and 6 to 10 per cent as well as to the 4 to 6 per cent grades.

In the routine practice of the art, ore and coke are charged into an electric furnace of the submerged arc type using single phase current. Furnaces using polyphase current are considered inapplicable. Only imported ores are used, there being a lack of domestic ores low enough in iron to make commercial ferrochromium with a chromium:iron ratio of 60:40 or better. Typical ores analyze as follows:

|  | Rhodesian | Russian |
|---|---|---|
|  | Percent | Percent |
| $Cr_2O_3$ | 48 | 45.71 |
| FeO | 13 | 11.67 |
| $SiO_2$ | 6.5 | 9.16 |
| MgO | 12.0 | 21.00 |
| $Al_2O_3$ | 12.0 | 7.38 |

The magnesia of the analyses is partly in the chromite and partly in the gangue. But taking the silica, magnesia and alumina, they are not in proportions to form a good slag. Calculated roughly in molecules, in the Rhodesian analysis for each molecule of MgO there are 0.36 $SiO_2$ and 0.39 molecule alumina or a molecular base-acid ratio of 1.32:1, while in the Russian ore, for each molecule of MgO there are 0.29 molecule silica and 0.14 $Al_2O_3$, a 2.33:1 molecular ratio of base to acid.

In practice, the furnace produces molten ferrochromium and a supernatant viscous slag, both being removed from time to time. With expert workmen, a furnace of the usual type, using single phase current, can be run continuously for a rather long period. Viscidity in the slag is considered desirable in making ferrochrome of the ordinary carbon grades and is sometimes purposely enhanced as by adding a little lime. A considerable amount of metal in shot form goes into the slag and is recovered by cooling, crushing and separating. Unreduced fine ore is usually a component. The slag always carries 4 per cent or more of $Cr_2O_3$ as a component and usually about 8 to 10 per cent shot metal. The former is not recovered.

In addition to the metal and the viscid semi-slag, there is a production of what is called a "crust", occurring in the bottom of the furnace and under the electrode. This crust may be due to a partial reduction of ore with production of higher melting bodies, perhaps containing CrO in lieu of FeO. Its composition is variable, but it is a spongy, semi-metallic plastic layer containing a considerable amount of shot metal. The formation of this crust is a serious difficulty with single-phase furnaces and practically precludes the use of three-phase furnaces. Because of the formation of this crust, the furnace hearth builds up, causing the electrodes to ride higher and higher in the furnace, and the metal and slag must be tapped off from a higher level. After a time, the furnace must be burned down and fluxed out before the smelting can continue. The difficulties with the crust can be alleviated to some extent by raking out some of it from time to time. The crust is spongy enough and soft enough to permit this. But raking out is laborious and unsatisfactory. The melting point of the crust is higher than that of the metal or the floating slag.

The crust is variable in composition and exact analysis is difficult in any event because of the presence of free metal in it. As a rule, it runs about 20 to 30 per cent chromium, 39 to 50 per cent iron, 5 to 10 per cent silica, 10 to 15 per cent magnesia. It may contain 6 to 10 per cent lime when a small amount of lime is present in the furnace charge.

While, perhaps, the crust could be melted or obviated at higher temperatures, this is not done; the furnace being run at such a temperature as will merely make molten ferrochromium metal and a viscous, slow flowing upper slag. As stated, it is the belief that with a thinner slag, the carbon in the ferrochromium will be too high; that, instead of being at a maximum of 6 per cent, it will rise to 8 or 10 per cent. So great is the fear of a thin, floating slag that in the art at times, as stated, the viscosity is purposely increased.

The floating slag comes from the impurities of the ore. These impurities, in the amounts found in standard ores, are never self-fluxing and the slag which is actually produced represents self-fluxing of some of the impurities. The rest probably goes into the crust.

These are generalizations; in practice, what actually occurs depends on many variables. But in a general way, an imperfect reduction tends to make a thinner slag, FeO and $Cr_2O_3$ entering the slag as bases; in other words, the slag, instead of carrying merely 4 to 6 per cent $Cr_2O_3$, may carry more. One puzzling fact is that when too much $Cr_2O_3$ goes into the slag a ferrochromium unduly high in carbon results.

By making the slag thick and sluggish, it is difficult to separate metallics, but it is easier to hold 4 to 6 per cent carbon in the ferrochromium. In making a thick slag, there is, however, some loss of ore remaining with the slag in physical admixture. By frequent tapping, it is easier to keep the furnace running, but the loss is greater.

In the formation of a spongy crust, there is an increase in conductivity and to hold the same power load, the upper electrode must be raised. There are practical limits to the use of larger carbons with lower voltages. Often the crust freezes and a new layer of metal forms. When this happens, for a time the metal may be removed by tapping high, but in the end conditions must be remedied by burning down or fluxing out.

All these troubles have been thought irremediable. Unsuccessful attempts have been made to tap the furnace into fore-hearths equipped with electrodes to further heat the slag and make the contained metal settle. But the slag produced usually contains unreduced ore as well as metal inclusions.

As stated, the ordinary operation is empirical, but it is found that increasing the coke makes the slag viscous, and it is the feeling that the viscosity of the slag is tied up in some way with production of ferrochromium of the right composition and with avoiding loss of too much $Cr_2O_3$ in the slag. The coke content of the mix is watched closely and there seems to be only one narrow range where the 4 to 6 per cent carbon grade of ferrochrome can be made.

I have found, however, that most considerations urged in the art disappear and that clean operation can be effected with non-formation of crust by adding sufficient lime to the charge to make a highly basic slag having consequently a high melting point and allowing the temperature of the furnace to rise to a point where this highly basic slag is melted to free running liquidity. Addition of lime may be in such proportion as to give a molecular ratio in the slag of base $(CaO+MgO)$ to acid $(SiO_2+Al_2O_3)$ as high as 4:1. I usually add lime in an amount greater than the equivalent of the FeO in the ore and with the usual ores this gives about a 2:1 base-acid ratio in the slag as a minimum. There is usually some magnesia in the high grade ore and this is allowed for in adding the lime. The addition of lime has a number of interesting functions. For one thing, it displaces the FeO of $FeO.Cr_2O_3$ and makes reduction easier. For another thing, entrance of FeO and $Cr_2O_3$ into the slag is prevented. The temperature required in smelting automatically rises well above the melting point of the ferrochromium metal and the carbon content of the metal remains fairly constant. Continuous operation of the furnace becomes smooth and regular.

A clean 2-layer separation into molten metal and floating slag can be effected and both may be tapped separately. The slag is thin and carries little or no metallics, to that extent obviating the necessity for cooling, crushing and separating. However, as a matter of fact, with the higher proportions of lime, the slag becomes self-disintegrating on cooling.

With the addition of lime, conditions in the furnace become much more controllable and the carbon in the ferro-chromium corresponds, more or less closely, with the amount of coke used in the mixture. By decreasing the coke, the carbon in the ferrochromium is decreased, and vice versa.

Commercial ferrochromium of standard quality contains not less than 60 per cent metallic chromium; the chromium-iron ratio is not less than 60:40. The best grade is 70:30. All high grade ores used in the United States for making standard ferrochromium, come from abroad, namely from New Caledonia, Russia and Rhodesia. All three supply ores of sufficient purity and of a sufficiently low ratio of iron to chromium to make standard ferrochrome. Pure chromite, $FeO.Cr_2O_3$, as a matter of fact, if it could be obtained free of gangue, would not give the best grade of ferrochromium; the ratio of iron to chromium is too high. That these imported ores have a sufficiently low iron ratio is due to the fact that, considered as minerals, they have some MgO replacing part of the FeO; instead of being chromites of ferrous iron, they are chromites of iron and magnesia. Standard grades of commercial imported ore all carry, in addition, more or less gangue containing magnesia, alumina and silica.

By adding lime to the charge, 3-phase furnaces with their various advantages become practicable in continuous operation. The amount of lime added varies with the ore and other conditions, but with the usual ores it is around 10 per cent of the charge, and it may go as high as 15 per cent. If the amount of lime (and magnesia) is sufficient to give a tribasic aluminate and there is enough more to give a lime:silica ratio of at least 1.75:1, a self-disintegrating slag is produced. In a particular embodiment of the present process, as applied to the Rhodesian ore, of which an analysis is given above and using an ordinary single phase ferrochromium furnace, the mixture charged into the furnace, for each 2000 pounds of ore, includes 440 pounds of coke and 200 pounds of lime which is substantially the equivalent of the FeO in the ore. In customary prior practice, about the same amount of coke would be used, although usually the coke is varied somewhat in adjusting the viscosity of the slag. With this particular ore and with this particular amount of lime, the base-acid ratio in the slag rises to 2:1. The slag temperature increases by about 200° going to a range between 1700° and 1800° C., which is well above the melting point of the ferrochromium metal produced. The slag is free running and contains less than 3 per cent $Cr_2O_3$. Its $CaO:SiO_2$ ratio is 1.66:1. It does not carry substantial amounts of metallics. The reduced metal tapped from the furnace at a constant low level runs from 72 to 75 per cent in chromium content and the yield of ferrochromium averages over 95 per cent of the chromium and iron in the ore. The metal carries about 5 per cent carbon. By reducing the proportion of coke in the furnace charge below that stated, the carbon in the metal can be decreased to below 2 per cent. By using more coke the carbon content may be increased to 10 per cent if desired.

In treating the Russian ore under this invention to make the 4 to 6 per cent carbon grade of ferrochrome, the charge for each 2000 pounds of ore includes 367 pounds of coke and 182 pounds of CaO. In the regular practice, the proportion of coke to ore would be about the same, varying a little, but only in rare instances would anything else be added. The free running slag tapped from the furnace contains a 2.86:1 base-acid ratio and less than 3 per cent $Cr_2O_3$.

In the regular practice with the Rhodesian ore, the viscous slag would carry 8 to 10 per cent metal, whereas the slag made as described carries substantially no metallics. The same is true of the slag from the Russian ore.

In routine practice, there is always a greater or less production of crust but this is not formed in the present operation.

As the furnace runs continuously and cleanly without accumulations of side products, for any given power input, the smelting zone, and consequently the size of the furnace required, is smaller. Utilization of the chromite ore is complete; there is no necessity for allowing any to pass out with the slag.

While I have described the present invention as applied particularly to making commercial ferrochromium from high grade chromium ores having a low ratio of iron to chromium, it is applicable to other ores having a higher iron ratio; in making chrome irons and chrome steels.

In a prior and copending application, Serial No. 716,433, filed March 19, 1934, I have described and claimed a chromite ore altered by having the greater part of the FeO in the natural ore replaced by CaO; the altered ore being of particular utility as a material for making ferro alloys of high chromium content. This altered ore lends itself readily to the present process of making ferrochromium with production of a thinly fluid highly basic slag at a high temperature. The altered ore has a high ratio of Cr to Fe and carries sufficient lime to render further additions unnecessary in securing my smelting conditions.

As described in said prior application, the lime content of the altered ore facilitates its reduction. The altered ore gives a liquid slag readily separable from the reduced metal and carrying but little chromium oxid, or included metal. In the smelting of the artificial lime chromite ore, the furnace operation is smooth and regular, the metal produced is of a higher chromium content than can be produced from any domestic natural ore available and the carbon content of the ferrochromium can be controlled down to 1 to 2 per cent.

What I claim is:—

1. In making ferrochromium of high chromium content and of controlled carbon content from chromite ores containing chromium and iron in an electric furnace with the aid of carbon as reducing agent, the continuous process which comprises the continuous step of smelting the ore with an amount of carbon adjusted to reduce both the chromium and iron of the ore and to supply a predetermined content of carbon in the ferrochromium and in the presence of CaO with the ore in amount sufficient to form with the impurities present a slag having a molecular ratio of bases to acids about 2:1 and at a temperature sufficient to make such slag thinly fluid and free-running and separating the molten slag and the molten ferrochromium.

2. In the continuous process of claim 1, charging into the furnace a natural chromite ore with an admixture of coke furnishing the carbon reducing agent and lime.

3. In the continuous process of claim 1, charging into the furnace the adjusted amount of carbon with an altered natural ore containing CaO replacing the FeO of the natural ore.

4. In the continuous process of claim 1, charging into the furnace a natural ore of the proper chromium:iron ratio in admixture with the adjusted amount of carbon and with lime in an amount about equivalent to the FeO contained in the natural ore.

5. In the continuous process of claim 1, charging into the furnace a mixture of carbon and chromite ore with sufficient lime to produce a basic slag with the impurities present, the molecular ratio in the slag of lime and magnesia, taken together, to the alumina and silica, taken together, being not less than 2:1.

6. A continuous method of reducing ferrous chromite ores with carbon to make ferrochromium of controlled carbon content which comprises continuously smelting the ore in an electric furnace with an adjusted amount of carbon sufficient to reduce the ore and to provide carbon for the ferrochromium and in the presence of sufficient lime to form a slag of relatively high basicity with a melting point above that of the ferrochromium and at a temperature high enough to make said slag a mobile free-running liquid and the smelting operation smooth and regular and separating the slag from the reduced ferrochromium.

7. In the method of claim 6, adjusting the proportions of ore and carbon so as to produce a grade of ferrochromium containing from 4 to 6 per cent carbon.

8. In the method of claim 6, adjusting the proportions of ore and carbon so as to produce a grade of ferrochromium containing less than 4 per cent carbon.

9. In the method of claim 6, adjusting the proportions of ore and carbon so as to produce a grade of ferrochromium containing more than 6 per cent carbon.

10. In making standard ferrochromium from chromite ores in the electric furnace with carbon as reducing agent for both the chromium and the iron of the ore, a continuous process which comprises adding sufficient base to the furnace charge of ore and carbon reducing agent to form a slag having a molecular ratio of contained base to acid between 2:1 and 4:1 and allowing the temperature of the charge to rise sufficiently to render said slag free running.

11. A process for making high chromium ferrochromium by reduction of a chromite ore containing chromium and iron in an electric furnace with carbon as reducing agent, wherein as a process step the ore is smelted with the amount of carbon required to reduce the chromium and the iron of the ore and to put a controlled content of carbon in the ferrochromium and with addition of sufficient lime to make with the impurities present a highly basic slag having a molecular base-acid ratio about 2:1 and a high melting point, and the temperature is sufficiently high to make such slag thinly fluid and free running so that the slag separates from the molten ferrochromium substantially without admixture of metal with the slag and the amount of unreduced chromium oxid remaining in the slag is minimized.

12. In reducing chromite ores in the electric furnace with carbon as reducing agent to make carbon-containing ferrochromium of a chromium-iron ratio corresponding to that of the ore charge with slagging of the ore gangue, a process improvement permitting close regulation of the carbon content of the ferrochromium which comprises raising the free running temperature of the slag to a point well above the melting point of the ferrochromium by adding lime to the furnace charge in sufficient quantity to make the slag highly basic.

13. A process improvement according to claim 12 wherein the lime addition to the furnace charge is sufficient to give the slag a molecular ratio of base to acid components not less than 2:1.

14. In the electric smelting of a chromite ore with carbon to make ferrochromium containing carbon and a slag containing the gangue of the ore, adding lime with the ore to raise the basicity of the slag to a base-acid molecular ratio at least 2:1, raising the temperature to make said slag free running and regulating the carbon content of the ferrochromium by adjusting the quantity of carbon with the ore in a predetermined direct ratio.

MARVIN J. UDY.